United States Patent [19]

McNeill

[11] Patent Number: 5,243,621
[45] Date of Patent: Sep. 7, 1993

[54] METHOD OF FEEDING GLASS BATCH TO A GLASS-MELTING FURNACE

[76] Inventor: Keith R. McNeill, Cliff Cottage, Long Lane, Earlshealon, West Yorkshire WF12 8LG, Great Britain

[21] Appl. No.: 781,134
[22] PCT Filed: Apr. 26, 1991
[86] PCT No.: PCT/GB91/00670
§ 371 Date: Jan. 22, 1992
§ 102(e) Date: Jan. 22, 1992
[87] PCT Pub. No.: WO91/16272
PCT Pub. Date: Oct. 31, 1991

[30] Foreign Application Priority Data
Apr. 26, 1990 [GB] United Kingdom .......... 9009336

[51] Int. Cl.⁵ .......................... C03B 3/00
[52] U.S. Cl. .................. 373/33; 373/29; 373/31; 373/34; 65/27; 65/134; 65/335
[58] Field of Search ............ 373/27-30, 373/33-35, 41, 5, 40, 37; 65/135, 136, 335, 134, 27; 432/180, 181, 182

[56] References Cited

U.S. PATENT DOCUMENTS

| | | | |
|---|---|---|---|
| 1,610,376 | 12/1926 | Hitner | 373/27 |
| 3,337,324 | 8/1967 | Cable, Jr. et al. | |
| 3,944,713 | 3/1976 | Plumat et al. | 373/27 |
| 3,954,433 | 5/1976 | Holler | 65/29 |
| 4,029,489 | 6/1977 | Froberg et al. | 65/136 |
| 4,328,019 | 5/1982 | Dejaiffe et al. | 65/19 |
| 4,395,830 | 8/1983 | Lockwood | 34/10 |
| 4,752,314 | 6/1988 | Fassbender et al. | 65/134 |
| 4,789,990 | 12/1988 | Pieper | 373/32 |

FOREIGN PATENT DOCUMENTS 0109086 11/1983 European Pat. Off. .
931432 12/1954 Fed. Rep. of Germany .
1395208 3/1965 France .
2120115 8/1972 France .
2370701 6/1978 France .
0270199 8/1950 Switzerland .
0647657 12/1950 United Kingdom .
0807669 1/1959 United Kingdom .
0902826 8/1962 United Kingdom .
1063716 3/1967 United Kingdom .
1333130 10/1973 United Kingdom .
1554677 10/1979 United Kingdom .
9013522 11/1990 World Int. Prop. O. .

*Primary Examiner*—Bruce A. Reynolds
*Assistant Examiner*—Tu Hoang
*Attorney, Agent, or Firm*—Cushman, Darby & Cushman

[57] ABSTRACT

A method of feeding glass to a glass-melting furnace for making a vitreous material, a heated airstream containing air at a temperature in excess of 1,000° C. is passed down vertical cylinders towards the crown of the glass-melting furnace. Powdered glass batch is introduced into the vertically moving heated airstream in the lower and wider cylinder and infra-sound is applied to the vertically moving heated airstream by an infra-sound generator to vibrate the heated airstream and effect heat transfer from the airstream to the glass batch particles so that the glass batch particles are heated and the temperature of the heated airstream is reduced to a temperature below 700° C., thereby reducing the propensity of the air to produce nitrogen oxides. Fuel is subsequently added as the heated glass batch particles and the cooled airstream move downwardly towards the crown of the furnace and a stream of glass batch, burning fuel and air is passed downwardly through the crown of the furnace in a manner such that there is a direct contact between the flame of the burning fuel and the surface of molten glass within the furnace, and the glass batch is melted.

7 Claims, 3 Drawing Sheets

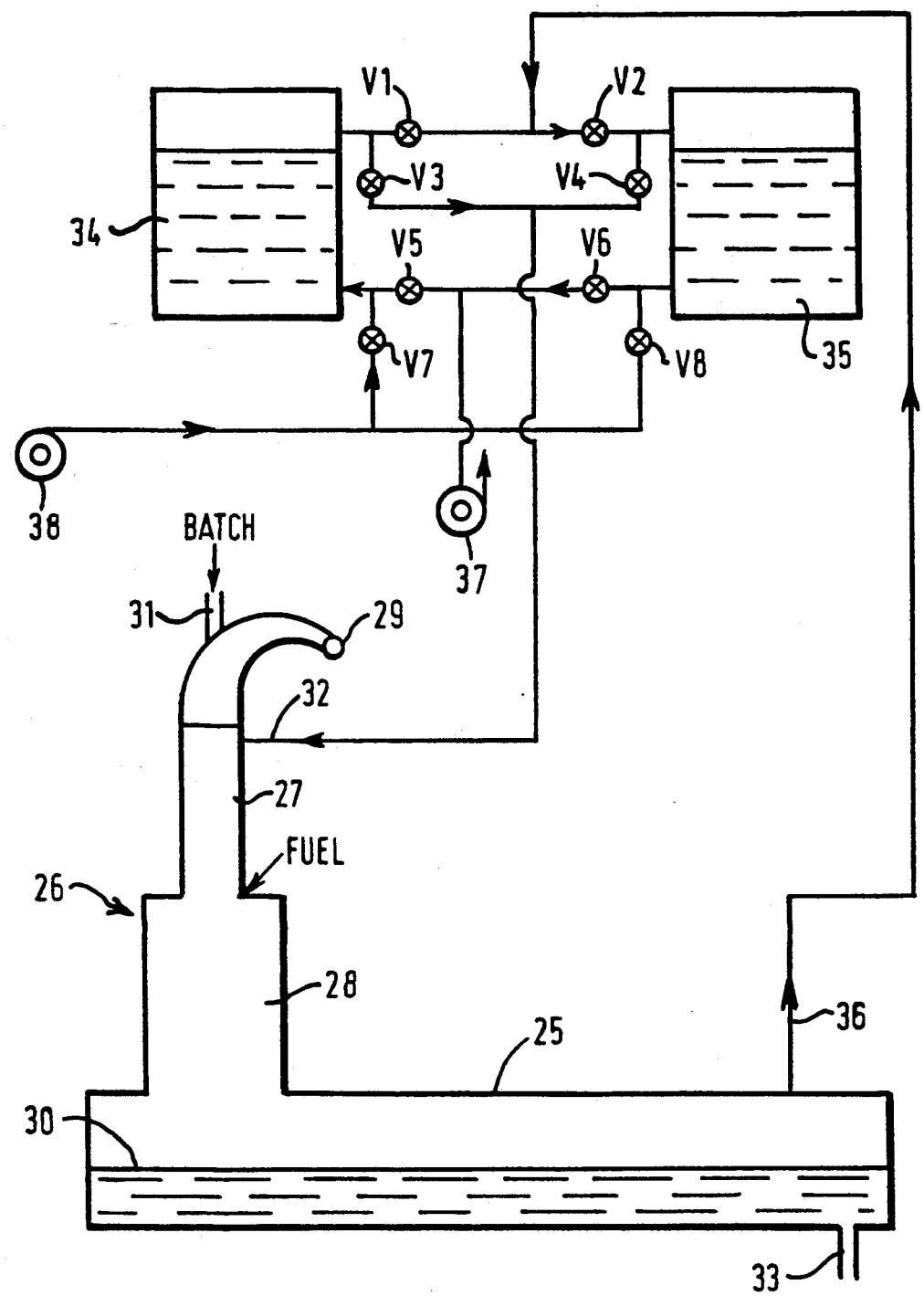

METHOD OF FEEDING GLASS BATCH TO A GLASS-MELTING FURNACE

FIELD OF THE INVENTION

This invention relates to a method of feeding glass batch to a glass-melting furnace.

SUMMARY OF THE INVENTION

In accordance with the present invention a method of feeding glass batch to a glass-melting furnace includes the step of feeding powdered glass batch vertically downwardly through a hot air environment, applying infra-sound to the hot air environment containing the powdered glass batch to facilitate transfer of heat from the hot air environment to the powdered glass batch and, subsequent to the said heat transfer, adding fuel to the heated glass batch to raise the temperature of the glass batch to melting temperature.

The application of the infra-sound facilitates transfer of heat from the hot air environment to the powdered glass batch by imposing a vibrational relative movement between the hot air and the powdered glass batch.

Preferably in accordance with the present invention the heat transfer from the hot air environment to the glass batch cools the hot air environment to a temperature of the order of 700° C. or even to a temperature lower than 700° C.

Such cooling of the hot air environment is important in substantially reducing the propensity of the airstream to produce nitrogen oxides ($NO_x$) when the airstream reacts with fuel immediately upon the combustion resulting from the introduction of the fuel.

The hot air environment is advantageously provided by an airstream which is pre-heated by waste gases from the glass-melting furnace. The airstream is preferably pre-heated to a temperature of the order of 1,200° C.

Such pre-heating may be effected in stages by passing air from the atmosphere through successive heat exchangers.

More specifically in accordance with the present invention, there is provided a method of feeding glass batch to a glass-melting furnace for making a vitreous material comprising the steps of passing a heated airstream containing air at a temperature in excess of 1,000° C. vertically downwardly towards the crown of the glass-melting furnace, introducing powdered glass batch into the vertically moving heated airstream, applying infra-sound to the vertically moving heated airstream to vibrate the heated airstream and effect heat transfer from the airstream to the glass batch particles to heat the glass batch particles and reduce the temperature of the heated airstream below 700° C., subsequently adding fuel as the heated glass batch particles and the cooled airstream move downwardly towards the crown of the furnace, and passing a stream of glass batch, burning fuel and air downwardly through the crown of the furnace such that there is direct contact between the flame of the burning fuel and the surface of molten glass within the furnace, and the glass batch is melted.

In the embodiment of the invention which will be described, the fuel is added around a circumference of the downwardly moving airstream and heated glass batch particles, but the fuel may be injected into the downwardly moving airstream and heated glass batch particles.

By the use of the present invention it has proved possible to form glasses having high melting points, for example a melting point in excess of 1400° C., which have proved difficult to produce in conventional furnaces.

The present invention will be further understood from the following detailed description of preferred embodiments thereof which is made, by way of example, with reference to the accompanying drawings, in which:

BRIEF DESCRIPTION OF THE DRAWINGS

FIG. 3 is a diagrammatic representation of an alternative apparatus for carrying out the method of the present invention.

DESCRIPTION OF THE PREFERRED EMBODIMENTS

Figure 1A:
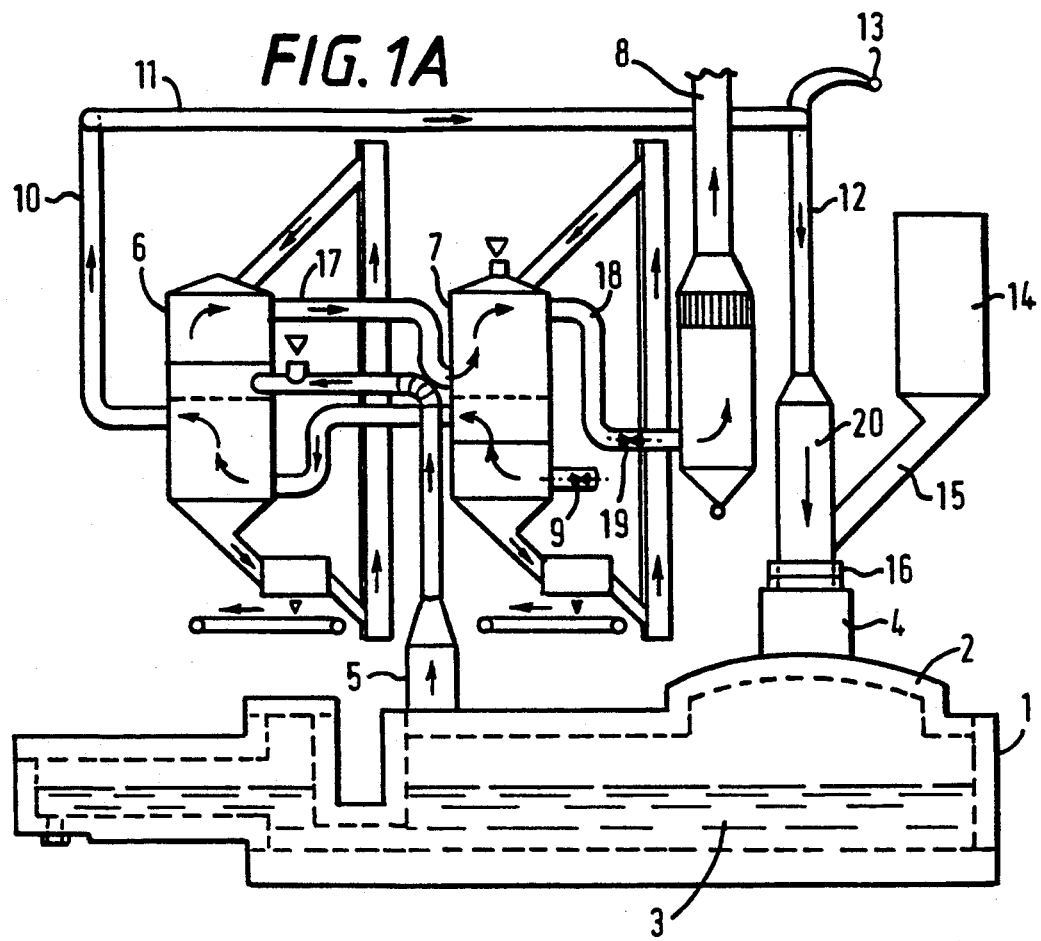
FIGS. 1a and 1b are respectively elevation and plan views of apparatus including a furnace for carrying out the method of present invention.
Figure 1B:
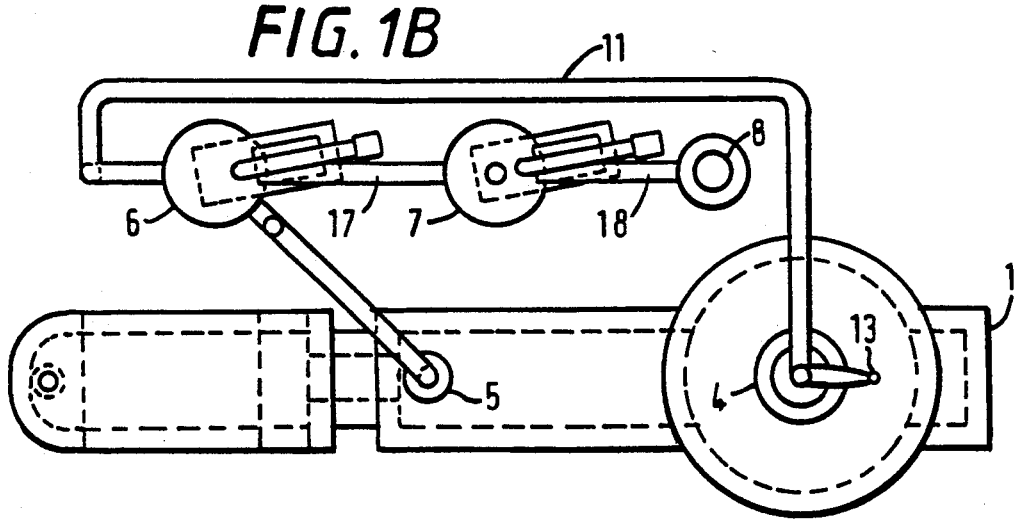

Referring to FIGS. 1a and 1b of the accompanying drawings, there is shown a glass-making furnace 1 having a crown 2 and containing molten glass 3. The crown 2 of the furnace 1 supports a cylinder 4 through which heated glass batch and flame are fed into the interior of the furnace.

Waste gases from the furnace 1 exit through a vertical duct 5 and are drawn through upper part of heat exchanger 6, ducting 17, upper part of heat exchanger 7 and further ducting 18 by a fan 19 to the base of a chimney stack 8 through which the waste gases are vented to atmosphere after suitable filtration.

The heat exchangers 6 and 7 each comprise a moving pebble bed regenerator based on the pebble bed heater described by C. L. Norton Jr. in the Journal of The American Ceramic Society, Volume 29, (1946) No. 7, pages 187-193. The pebble bed regenerators 6 and 7 may be additionally used to remove oxides of nitrogen ($NO_x$) and oxides of sulphur ($SO_x$) by addition of ammoniacal water and alkali respectively, as described in my co-pending International Patent Application No. PCT/GB 89/01361.

However, by use of the preferred method in accordance with the present invention, the quantities of $NO_x$ produced on combustion may be so small that a special treatment with ammoniacal water to remove $NO_x$ from the waste gases may not be required.

Air from ambient atmosphere is drawn by a fan 9 through a lower part of pebble bed regenerator 7 and thereafter through a lower part of pebble bed regenerator 6 so that the air acquires heat in the pebble bed regenerators 7 and 6. The air is heated during its passage through the pebble bed regenerators 7 and 6 by taking heat from the heated pebbles moving under gravity in those pebble bed regenerators so that the air is heated to a temperature of the order of 1200° C. The heated air is then fed through ducts 10 and 11 and down a vertical cylinder 12, which is concentric with cylinder 4 above the crown of furnace 1.

An infra-sound generator 13 generates sound waves at a frequency of 15-20 cycles per second at a level of the order of 140 decibels, and these sound waves are passed directly down the cylinder 12, through a wider cylinder 20, and further through cylinder 4 into the interior of the furnace 1 where the sound waves are reflected from the surface of the molten glass 3.

A glass batch in powder form is fed from a hopper 14 through a channel 15 into the heated air in the wider cylinder 20. The particles of glass batch so introduced are in suspension in the heated air which is being vibrated in the wider cylinder 20 by the action of the infra-sound. The infra-sound causes a vibrational relative movement between the heated air and the particles of powdered glass batch. An enhanced heat transfer between the hot airstream and the powdered glass batch is thus effected and the temperature of the heated air is reduced to a temperature in the range of 500° C. to 600° C.

Accordingly much of the waste heat recovered from the glass-melting furnace is transferred to the glass batch before any fuel is added. The lowering of the temperature of the heated air as a result of this heat transfer results in a lowering of the temperature of the furnace waste gases and therefore a lowering of the propensity of the air to produce $NO_x$ as will be discussed later in relation to FIG. 2 of the accompanying drawings.

The partially heated glass batch passes downwardly from cylinder 20 to cylinder 4, into which fuel, for example gas or oil, is injected vertically downwardly through vertical inlets in a part 16, which surrounds the lower end of cylinder 20 and enables fuel to be injected to mix with the air and glass batch passing through cylinder 4 where the fuel ignites. As the glass batch passes down through cylinder 4, the burning fuel in cylinder 4 raises the temperature of the glass batch substantially to the melting temperature of the components of the glass batch and the flame and heated batch both contact the surface of molten glass 3 in the furnace 1. The direct flame contact upon thinly distributed batch on the hot molten surface in the furnace 1 encourages melting and maturing of the batch into hot molten glass.

In operation of a furnace as described above, in which the batch was a mixture of flyash and limestone which was difficult to melt, an output of 24 tonnes per day of glass was obtained from a batch area of 7 m² in the furnace, when the furnace was operating on cold air and the melting point of the glass was 1440° C. The constitution of the final glass was
45% CaO
30% $SiO_2$
15% $Al_2O_3$
the balance being $Fe_2O_3$, $TiO_2$, a little alkali etc.

Figure 2:
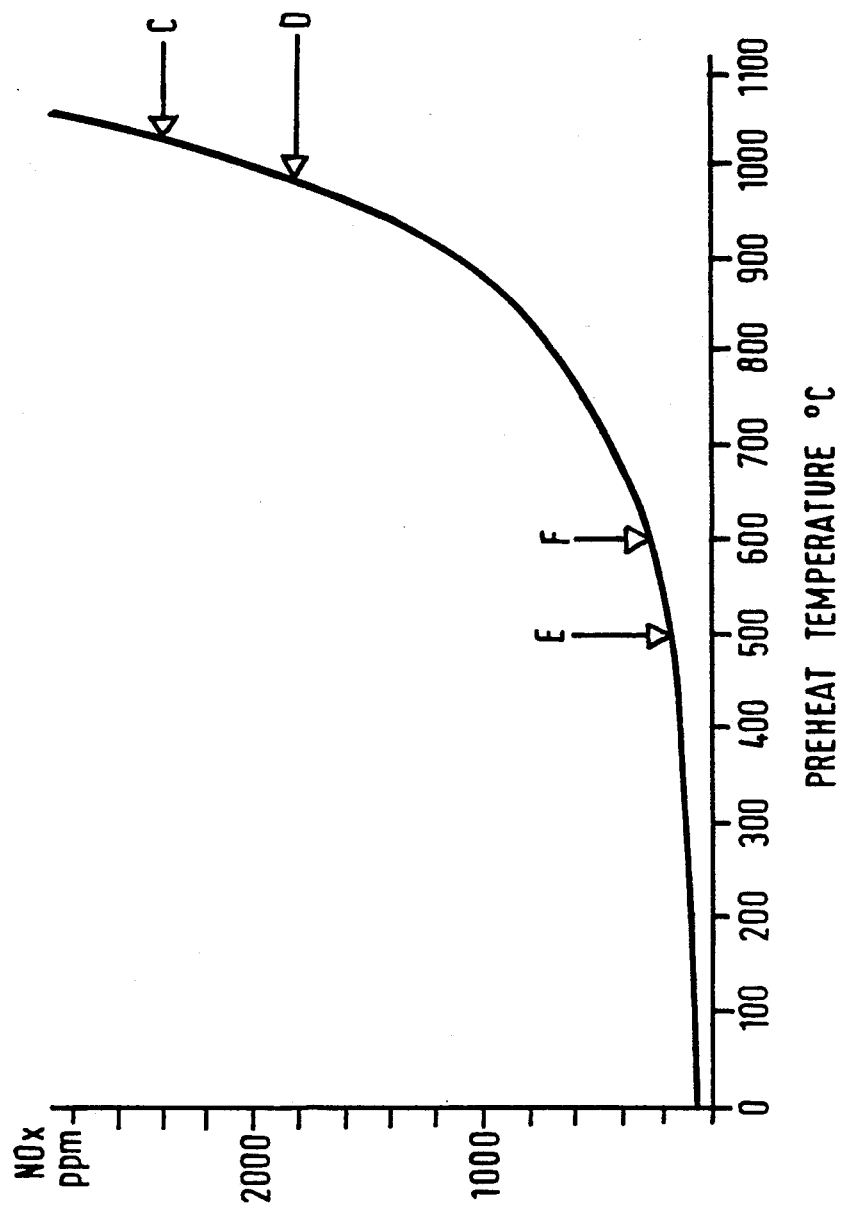
FIG. 2 is a graph showing the relationship between the production of nitrogen oxides ($NO_x$) upon gaseous combustion in pre-heated air and the temperature of the pre-heated air when the fuel is introduced and combustion is commenced.

Reference is now made to FIG. 2 of the accompanying drawings, which is a graph showing the relationship between the production of nitrogen oxides ($NO_x$) upon gaseous combustion in pre-heated air and the temperature of the pre-heated air when the fuel is introduced and combustion is commenced.

The graph of FIG. 2 shows that the rate of $NO_x$ production in the presence of fossil fuels, gas or oil is low when the preheat temperature of the air is below 700° C. Above 700° C. the rate of $NO_x$ production increases very significantly and from 800° C. upwards the rate of $NO_x$ production escalates at a rapid rate.

Typically on conventional furnaces, fuel is introduced into air pre-heated to a temperature in a range of about 1000°–1100° C. as indicated by arrows C, D in FIG. 2, which results in the production of $NO_x$ to an extent of about 2000 ppm of $NO_x$ per cubic foot of waste gas.

However, by the use of the method according to the present invention as described with reference to FIGS. 1a and 1b, the pre-heat temperature of the air is reduced to be within the range of 500°–600° C. as indicated by arrows E and F in FIG. 2, and the amount of $NO_x$ produced is only of the order of 300 ppm of $NO_x$ per cubic foot of waste gas.

In FIG. 3 of the accompanying drawings there is shown diagrammatically an alternative apparatus for carrying out the method of the present invention using static bed heat regenerators for preheating the air.

Referring to FIG. 3 there is shown a glass melting furnace 25 having a reaction tower 26 through which the furnace 25 is vertically fired and fed. Tower 26 has upper and lower co-axial cylindrical sections and an infrasound generator 29 mounted to direct infrasound waves down the tower 26. Preferably the sound waves have a frequency of 15 to 20 cycles per second and an energy level of 140 decibels. The infrasound waves are directed vertically down the tower 26 and reflected from the surface of molten glass 30 in the furnace 25, to impart vertical vibrations to the gas in the tower 26.

Powdered glass batch is fed intermittently and substantially axially into the top of the tower 26 as shown at 31. Heated air is also introduced substantially at the top of the upper section 27 of the tower 26 as shown at 32.

The heated air introduced at 32 is at a temperature of the order of 1200° C. and by virtue of the infrasound waves the molecules of the heated gas will be vibrated in the upper cylindrical section 27 of the tower 26 so that a good heat transfer from the hot air to the powdered glass batch introduced at 31 occurs in the upper cylindrical section 27 of the tower 26. The temperature of the hot air is reduced to a temperature in the range 500° to 600° C. by the time the pre-heated glass batch reaches the junction between the upper and lower cylindrical sections 27 and 28 immediately below which the fuel, which may be oil or gas, is introduced into the wider lower cylindrical section 28 of the tower 26. The resulting combustion in the lower cylindrical section 28 raises the temperature of the glass batch substantially to the melting temperatures of the components of the batch and the heated glass batch drops fall on the surface of the molten glass 30. The flame from the combustion in the lower cylindrical section 28 also impinges on the surface of the molten glass 30 and fans out over the surface of the molten glass 30 ensuring full melting of the glass batch components and maturing of the glass of the desired composition which is recovered from the furnace through feeder tube 33.

In the apparatus of FIG. 3 the hot air is ambient air heated by waste gases from the furnace using static regenerator beds 34 and 35. Waste gases are taken from the furnace 25 as shown at 36 and fed alternatively to static bed regenerator 34 or static bed regenerator 35 according to the position of valves V1 and V2. In the position illustrated in FIG. 3 valve V1 is closed and valve V2 is open, so that the waste gases can pass to the top of regenerator bed 35 but cannot enter regenerator bed 34.

Fan 37 is therefore able to draw the hot waste gases through open valve V2, regenerator bed 35 and open valve V6, after which the waste gases are passed to a chimney (not shown) for discharge into the atmosphere after suitable filtration. Regenerator bed 35 is thus in the waste gas receiving part of its cycle, whereas regenerator bed 34, as will now be described, is in the air delivery part of its cycle.

Air from the atmosphere is drawn under the influence of a fan 38 through ducts to feed either valve V7 or valve V8. In the operating position of the apparatus shown in FIG. 3, where waste gases are heating regenerator bed 35, valve V8 is closed and air drawn from the atmosphere by fan 38 passes through open valve V7 into the base of regenerator bed 34 which was heated by furnace waste gases in the immediately preceding waste gas receiving part of its cycle. The air passes through regenerator bed 34 and is removed from the upper part of that bed 34 through open valve V3 and fed to the top of the upper cylindrical section 27 of the reaction tower 26 at 32 as previously described.

The positions of all of the valves V1 to V8 are reversed from the closed to the open or the open to the closed position at regular intervals of between 15 seconds and 3 minutes depending on the size of the regenerator beds 34 and 35, in order to maintain both regenerator beds 34 and 35 at maximum temperature.

When a reversal of the regenerator system is to be made the operating conditions of the valves are changed in the following order.

First, valves V2 and V6 are closed and valves V8 and V4 are opened. These valve changes stop the introduction of waste gases into regenerator bed 35 and allow atmospheric air drawn into the system by fan 38 to be passed through valve V8, heated regenerator bed 35 and valve V4 to the line or ducting 32 and the upper end of upper cylindrical section 27 of the reaction tower 26. At this instant heated gas is being supplied to the upper cylindrical section 27 of the reaction tower 26 through both regenerator beds 34 and 35.

Once the flow of heated air to the reaction tower 26 through regenerator bed 35 has been established, the operating conditions of valves V3, V7, V5 and V1 are changed so that valves V3 and V7 become closed and valves V5 and V1 are opened. Waste gases received from the furnace through line or ducting 36 are now directed into the top of the regenerator bed 34 and drawn by fan 37 through regenerator bed 34 before being passed to the chimney for discharge.

The operation of the valve as described ensures that there is always a flow of hot air to the reaction tower 26.

The static regenerator beds 34 and 35 may consist of refractory or metal balls of 19 mm diameter. The bed material which in this example consists of the 19 mm balls can be discharged intermittently for cleaning, and replaced by clean balls fed into the beds under gravity.

In operation of the apparatus of FIG. 3 in a method in which glass is melted at 1440° C., waste gases at about 1300° C. are passed through the regenerator bed 34 or 35 which is in the waste gas receiving part of its cycle, and the relevant bed is heated near to this temperature. During the succeeding air delivery part of the cycle of that regenerator bed, atmospheric air to be used for combustion is heated to a temperature of the order of 1200° C., a heat transfer from waste gases to combustion air in excess of 90% being achieved.

By the use of the apparatus of FIG. 3 in which the upper cylindrical section 27 of reaction tower 26 allows time between the point where the glass batch is mixed with the heated combustion air introduced at 32 and the point where fuel is added at the top of lower cylindrical section 28, the glass is preheated at the expense of the heat contained in the combustion air introduced at 32. In consequence the temperature of the combustion air is reduced to a temperature below 700° C. before the fuel is added, and the quantity of $NO_x$ which results from the introduction of the fuel and the consequent combustion is also reduced to the order of 300 ppm of the waste gas as explained above with reference to FIG. 2.

I claim:

1. A method of feeding glass batch to a glass-melting furnace, which includes the steps of:
   (a) feeding powdered glass batch vertically downwardly through a hot air environment;
   (b) generating infra-sound;
   (c) directing the infra-sound towards the hot air environment containing the powdered glass batch to facilitate a transfer of heat from the hot air environment to the powdered glass batch; and
   (d) subsequent to the said transfer of heat, adding fuel to the heated glass batch to heat the glass batch to a melting temperature.

2. A method according to claim 1 wherein the transfer of heat cools the hot air environment to a temperature below 700° C.

3. A method according to claim 1 wherein the hot air environment is provided by an airstream pre-heated by waste gases from the glass-melting furnace.

4. A method according to claim 3 wherein the airstream is pre-heated to a temperature of at least 1,200° C.

5. A method of feeding glass batch to a glass-melting furnace comprising a crown, for making a vitreous material comprising the steps of:
   (a) passing a heated airstream containing air at a temperature in excess of 1,000° C. vertically downwardly towards the crown of the glass-melting furnace in which there is a molten glass upper surface;
   (b) introducing powdered glass batch into the heated airstream;
   (c) generating infra-sound;
   (d) directing the infra-sound towards the heated airstream to vibrate the heated airstream and effect heat transfer from the heated airstream to the powdered glass batch to heat the powdered glass batch and cool the heated airstream to a temperature below 700° C. to provide a cooled airstream;
   (e) subsequently adding fuel as the heated powdered glass batch and the cooled airstream move downwardly towards the crown of the furnace; and
   (f) passing a stream of powdered glass batch, burning fuel and air downwardly through the crown of the furnace to provide a flame of the burning fuel such that there is direct contact between the flame of the burning fuel and the molten glass upper surface within the furnace, and the glass batch is melted.

6. A method according to claim 5 wherein the fuel is added around a circumference of the heated airstream and heated glass batch particles.

7. A method according to any one of the preceding claims wherein the glass batch forms a glass having a melting point in excess of 1400° C.

* * * * *